United States Patent Office 3,310,580
Patented Mar. 21, 1967

3,310,580
COLCHICINIC DERIVATIVES AND PROCESS
OF PREPARATION
Arturo Bladé, Paris, and Georges Muller, Nogent-sur-Marne, France, assignors to Roussel-UCLAF, Paris, France, a corporation of France
No Drawing. Filed Oct. 29, 1963, Ser. No. 319,682
Claims priority, application France, Oct. 30, 1962, 913,881; Jan. 30, 1963, 923,184, Patent 2,418
9 Claims. (Cl. 260—465)

The present invention relates to new colchicnic derivatives as well as a process of preparation of these compounds.

The invention more particularly relates to the 1-cyano colchicinic derivatives of the general formula:

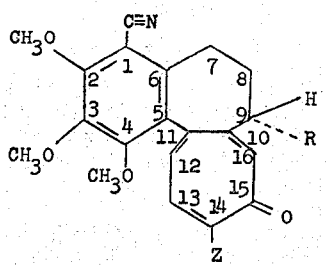

wherein R represents hydrogen or the radical

$R_1$ represents hydrogen or an alkyl radical having from 1 to 3 carbon atoms, and $R_2$ represents hydrogen or the acyl radical of an organic carboxylic acid having from 1 to 24 carbon atoms, and Z represents an —O-alkyl radical having from 1 or 2 carbon atoms or an —S-alkyl radical having from 1 or 2 carbon atoms.

The fundamental skeleton of the colchicinic derivatives is numbered here and hereafter after that of colchicine according to the general Formula I above. It could also be numbered according to the RRI 3923 system of Ring Index, 2nd Edition, 1960, as follows:

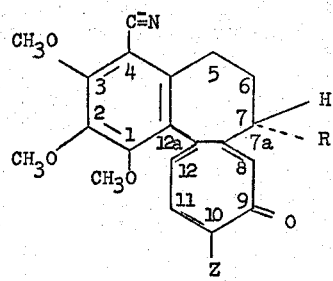

according to this system, the 1-cyano colchicinic derivatives of the invention would be called 4-cyano colchicinic derivatives.

The new compounds of the invention possess an interesting biological activity. More particularly, they exercise a remarkable antimitotic action and can be, on the other hand, utilized industrially in agriculture for modifications of mitosis and the creation of polyploids, either by sprinkling aqueous solutions or suspensions of the compounds of the invention on cultivated soil or by previous treatment of the seeds with the compounds of the invention, either pure or diluted in a solvent or on a support. These compounds can serve, in addition, as intermediates for the preparation of other colchicinic derivatives.

It is an object of the present invention to produce novel 1-cyanated derivatives of colchicinic compounds.

Another object of the invention is the obtention of a colchicinic derivative of the formula:

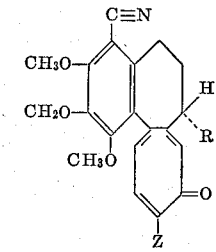

wherein R is selected from the group consisting of hydrogen and

$R_1$ is selected from the group consisting of hydrogen and alkyl having from 1 to 3 carbon atoms, $R_2$ is selected from the group consisting of hydrogen and the acyl radical of an organic carboxylic acid having from 1 to 24 carbon atoms, and Z is selected from the group consisting of —O-alkyl having from 1 to 2 carbon atoms and —S-alkyl having from 1 to 2 carbon atoms and particularly 1-cyano-colchicine and 1-cyano-thiocolchicine.

A further object of the invention is the development of a process for the production of a colchicine derivative of the formula:

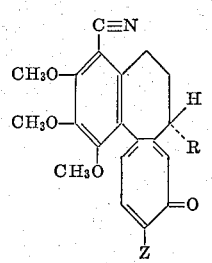

wherein R is selected from the group consisting of hydrogen and

$R_1$ is selected from the group consisting of hydrogen and alkyl having from 1 to 3 carbon atoms, $R_2$ is selected from the group consisting of hydrogen and the acyl radical of an organic carboxylic acid having from 1 to 24 carbon atoms, and Z is selected from the group consisting of —O-alkyl having from 1 to 2 carbon atoms and —S-alkyl having from 1 to 2 carbon atoms which comprises the steps of reacting a compound of the formula:

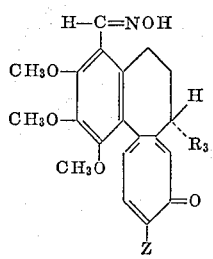

II wherein $R_3$ is selected from the group consisting of hydrogen and

$R_4$ represents the acyl radical of an organic carboxylic acid having from 1 to 24 carbon atoms, and $R_1$ and Z have the above assigned values, with a dehydrating agent and recovering said colchininic derivative.

Another object of the invention is the development of a process of modifying mitosis by the application of a safe but effective amount of the novel 1-cyanated derivatives of colchicinic compounds to cellular matter undergoing mitosis.

A further object of the invention is the obtention of the novel intermediates: 1-formyl-desacetylamino-colchicine and the oxime of 1-formyl-desacetylamino-cochicine.

These and other objects of the invention will become more apparent as the description thereof proceeds.

The preferred compounds according to the invention are the following:

(a) 1-cyano-colchicine
(b) 1-cyano-thiocolchicine.

1-cyano-colchicine occurs in the form of a colorless crystallized product soluble in chloroform, benzene, alcohol and acetone and insoluble in ether. Its melting point determined on the Kofler block is 258° C. Its specific rotation is $[\alpha]_D^{20} = -50° \pm 10°$ (chloroform).

1-cyano-thiocolchicine occurs in the form of yellow prismatic crystals soluble in alcohol, chloroform, benzene and acetone and insoluble in water and ether. Its melting point determined on the Kofler block is 220° C. Its specific rotation (solvated) is $[\alpha]_D^{20} = -100° \pm 10°$ (chloroform). Infrared spectra shows a band toward 2,210 cm.$^{-1}$ representing the CN group.

The process of preparation of the compounds according to the invention, is characterized in that the oxime of 1-formyl colchicinic derivatives of the general formula:

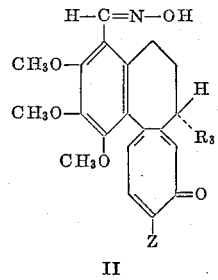

II wherein $R_3$ represents hydrogen or the radical

$R_4$ representing the acyl radical of an organic carboxylic acid having 1 to 24 carbon atoms and $R_1$ and Z have the above-indicated meanings is subjected to the action of a dehydrating agent. The corresponding 1-cyano derivative is isolated and this latter compound, if desired, especially where Z represents an —S-alkyl radical having 1 or 2 carbon atoms, is subjected to the action of a mineral acid in the presence of a lower alkanol and the corresponding desacylated 1-cyano derivative is obtained.

The 1-cyano desacylated derivatives thus prepared can be transformed according to known methods into compounds of Formula I with

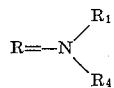

$R_1$ and $R_4$ having the above-noted meanings by reaction with any acylating derivative or organic carboxylic acids having from 1 to 24 carbon atoms. Among the acylating derivatives may be mentioned the acid anhydride or the acid chloride. The acyl radical of an organic carboxylic acid having from 1 to 24 carbon atoms is preferentially derived from alkanoyl radicals such as formyl, acetyl, propionyl, butytyl, lauryl, stearyl, palmityl, undecanoyl, lignoceryl; alkenoyl radicals such as oleyl, linoleoyl; arachidonyl; alkynoyl radicals such as clupadonyl; hydroxyalkanoyl radicals such as ricinoleyl; phenylcarbonyl radicals such as trimethoxy-benzoyl, p-phenylbenzoyl, p-cyclohexylbenzoyl, benzoyl; naphthalylcarbonyl radicals such as α-naphthoyl, β-naphthoyl; etc.

The starting compounds, the oximes of 1-formyl colchicinic derivatives of the formula:

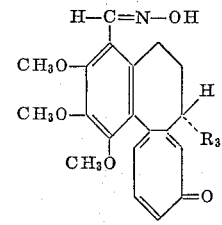

wherein $R_3$ and Z have the above-assigned meanings are prepared according to the method described in the copending, commonly-assigned United States patent application Ser. No. 279,610, filed May 10, 1963, now U.S. Patent No. 3,194,835. Examples of this process are given hereafter as purely indicative.

The execution of the process of the invention can be further characterized by the following points:

(a) The dehydrating agent employed is acetic acid anhydride;

(b) The reaction occurs at elevated temperature, preferentially at the reflux temperature of acetic acid anhydride;

(c) The mineral acid employed in the optional desacylating step is concentrated hydrochloric acid and the reaction occurs in the presence of methanol.

The following examples illustrate the invention without, however, limiting it. It is to be understood that other equivalent expedients known to those skilled in the art may be employed.

PREPARATION I

*Preparation of 1-formyl-colchicine*

1.02 gm. of colchicine were dissolved in 10 cc. of methylene chloride and 0.8 cc. of stannic chloride were added thereto. The formation of an abundant yellow precipitate was observed and the temperature increased to 50° C. The reaction mixture was cooled to room temperature and 2.5 cc. of 1,1-dichloromethyl methyl ether were added. The precipitate changed color and became red.

The reaction mixture was allowed to stand at room temperature for a period of two hours. Then some water and methylene chloride were added thereto. The mixture was triturated in order to decompose the complex and extracted with methylene chloride. The methylene chloride extract was washed and evaporated to dryness under vacuum.

1.10 gm. of raw 1-formyl-colchicine were obtained which was crystallized from ethyl acetate (yield: 70–80%). The product had an instantaneous melting point of 250° C.

The product occurred in the form of colorless crystals, soluble in chloroform, slightly soluble in ethyl acetate and insoluble in water and ether.

The structure of 1-formyl-colchicine was proved by the nuclear magnetic resonance spectra (NMR spectra). By comparison with a number of colchicinic derivatives, the

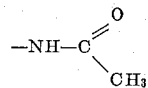

and $OCH_3$ functions and especially the proton functions in the $C_1$, $C_9$, $C_{12}$ and $C_{13}$, $C_{16}$ positions were located. By comparison to these known products, there was found in the 1-formyl-colchicine the presence of two complexed protons $C_{12}$ and $C_{13}$ and characteristic protons in the $C_9$ and $C_{16}$ positions. By contrast, the proton in the $C_1$ position which is located at 370 Hz had disappeared. In addition, a new aldehydic proton at 592 Hz was found.

*Analysis.*—$C_{23}H_{25}O_7N$; molecular weight = 427.44. Calculated: C, 64.62%; H, 5.90%; N, 3.28%. Found: C, 64.4%; H, 6.0%; N, 3.2%.

PREPARATION II

*Preparation of the oxime of 1-formyl-colchicine*

A mixture of 1.1 gm. of hydroxylamine hydrochloride, 14.5 cc. of ethanol and 5 gm. of 1-formyl-colchicine was introduced at room temperature into a solution of 650 mg. of sodium hydroxide in 6 cc. of water. The yellow solution obtained was allowed to stand for a period of four hours at room temperature. Next the reaction mixture was poured into water and the aqueous material was extracted with methylene chloride. The extract was washed with water, dried over magnesium sulfate, filtered and distilled to dryness under vacuum.

The residue was redissolved in ethyl acetate and ether was added thereto. The mixture was allowed to stand at 0° C. for a period of one hour and vacuum filtered. The precipitate was washed with a mixture of ethyl acetate and ether and dried.

4.11 gm. of the oxime of 1-formyl-colchicine were obtained being a yield of 81%.

The product occurred in the form of yellow crystals and was soluble in chloroform, acetone, ethanol, and dilute aqueous acids and alkalis, and very slightly soluble in ether, benzene and water. The product had a melting point of 190°–200° C. and a specific rotation $$[\alpha]_D^{20} = +246° \pm 2°$$

(c.=0.5% in chloroform).

*Analysis.*—$C_{23}H_{26}O_7N_2$; molecular weight=442.45. Calculated: C, 62.43%; H, 5.92%; N, 6.33%. Found: C, 62.4%; H, 6.1%; N, 6.1%.

This product is identical to that described in U.S. Patent No. 3,194,835.

PREPARATION III

*Preparation of 1-formyl-thiocolchicine*

1.19 gm. of thiocolchicine were dissolved in 8 cc. of methylene chloride and 0.8 cc. of stannic chloride were added thereto. This produced a solidification of the reaction mixture which became red and the temperature increased to 50° C. The reaction mixture was cooled to room temperature and 2.5 cc. of 1,1-dichloromethyl methyl ether were added thereto. The reaction was allowed to continue for a period of three hours and an evolution of hydrochloric acid was observed. Next the mixture was poured on ice. The precipitate was triturated with water and with methylene chloride and thereafter extracted with methylene chloride. The combined methylene chloride extracts were washed with water and with sodium bicarbonate solution, filtered and evaporated to dryness under vacuum.

1.21 gm. of 1-formyl-thiocolchicine were obtained which was purified by the formation of the oxime.

PREPARATION IV

*Preparation of the oxime of 1-formyl-thiocolchicine*

2 gm. of anhydrous sodium acetate in 30 cc. of ethanol were heated to reflux. 1 gm. of hydroxylamine hydrochloride was added thereto. Then 500 mg. of raw 1-formyl-thiocolchicine, obtained precedingly, were added and the reaction mixture was maintained at reflux for a period of one hour and thirty minutes. Next the solution was cooled to room temperature and water was added thereto. The aqueous mixture was extracted with methylene chloride. The extract was washed with water, filtered and distilled to dryness under vacuum. The residue obtained was dissolved in methylene chloride, reduced to small volume and ethyl acetate was added thereto to cause a precipitate.

400 mg. of the oxime of 1-formyl-thiocolchicine were obtained having a melting point of about 210° C. with decomposition. Its constants did not change by further recrystallization.

The product occurred in the form of yellow crystals and was soluble in chloroform, slightly soluble in ethyl acetate and insoluble in water and ether.

*Analysis.*—$C_{23}H_{26}O_6N_2S$; molecular weight=458.53. Calculated: C, 60.24%; H, 5.72%; N, 6.11%; S, 6.99%. Found: C, 60.5%; H, 5.9%; N, 5.9%; S, 6.9%.

This product is identical to that described in U.S. Patent No. 3,194,835.

EXAMPLE I

*(a) Preparation of 1-formyl-desacetylamino-colchicine*

2 gm. of desacetylamino-colchicine (having a melting point of 182–184° C.) were dissolved in 20 cc. of methylene chloride. The reaction mixture was cooled to −5° C. 5 cc. of 1,1-dichloromethyl methyl ether were added thereto. Then, drop by drop, 1.6 cc. of stannic chloride were added. The solution became deep red and rapidly deposited reddish black oil. The temperature was allowed to mount to 20° C. without agitation. An evolution of hydrochloric acid was produced. At the end of three hours, the reaction mixture was poured onto a mixture of water and ice and agitated for thirty minutes. The aqueous mixture was then extracted with methylene chloride. The extract was washed with water, with diluted sodium hydroxide solution and again with water and evaporated to dryness under vacuum.

2.1 gm. of a product were obtained which was subjected to chromatography through magnesium silicate. On elution with methylene chloride containing 5% of methanol, 1.52 gm. of 1-formyl-desacetylamino-colchicine were isolated having a melting point of 134° C. and 150° C. which product was crystallized from ether.

*Analysis.*—$C_{21}H_{22}O_6$; molecular weight=370.4. Calculated: C, 68.09%; H, 5.99%. Found: C, 68.4%; H, 6.2%.

This compound is not described in the literature.

*(b) Preparation of the oxime of 1-formyl-desacetylamino-colchicine*

A mixture of 920 mg. of hydroxylamine hydrochloride, 3 cc. of ethanol and 500 mg. of 1-formyl-desacetylamino-colchicine was added to a solution of 60 mg. of sodium hydroxide in 0.5 cc. of water. The reaction mixture was allowed to stand at rest for a period of two hours and thirty minutes at room temperature. Next the reaction mixture was poured into water and extracted with methylene chloride. The extract was washed with water, dried over magnesium sulfate, filtered and distilled to dryness under vacuum.

The raw product was purified by crystallization from ethyl acetate. 240 mg. of the oxime of 1 formyl-desacetylamino-colchicine were obtained having a melting point of 225° C.

This compound is very soluble in chloroform, very slightly soluble in ether and insoluble in water.

This compound is not described in the literature.

EXAMPLE II

*Preparation of 1-cyano-colchicine*

700 mg. of the oxime of 1-formyl-colchicine, prepared according to the Preparation II, were introduced into 5.5 cc. of acetic acid anhydride. The reaction mixture was heated to reflux for a period of two hours, cooled, then water was added thereto.

The aqueous mixture was treated gently in order to hydrolyze the excess of the anhydride. Next the solution was neutralized with a sodium hydroxide solution and extracted with methylene chloride. The extract was washed with saturated salt solution and dried over magnesium sulfate. Thereafter the extract was subjected to chromatography through alumina. On elution with methylene chloride containing 1% of methanol, 440 mg. of 1-cyano-colchicine were obtained which was crystallized from ethyl acetate. 400 mg. of colorless crystals of 1-cyano-colchicine were obtained being a yield of 60%.

The product was soluble in chloroform, benzene, alcohol and acetone and insoluble in ether. The product had a melting point of 258° C. and a specific rotation $[\alpha]_D^{20} = -50° \pm 10°$ (chloroform).

Analysis. — $C_{23}H_{24}O_6N_2$; molecular weight=424.44. Calculated: C, 65.08%; H, 5.70%; N, 6.60%. Found: C, 64.9%; H, 5.7%; N, 6.4%. This compound is not described in the literature.

EXAMPLE III

Preparation of 1-cyano-thiocolchicine 1 gm. of the oxime of 1-formyl-thiocolchicine, prepared according to Preparation IV, was introduced into 6 cc. of acetic acid anhydride and the reaction mixture was heated to reflux for a period of three hours. The excess of the acetic acid anhydride was hydrolyzed by the addition of water and gentle heating. The reaction mixture was cooled, neutralized with sodium bicarbonate and extracted with methylene chloride. The extract was washed successively with sodium bicarbonate solution and with a saturated salt solution, dried and distilled to dryness under vacuum.

The product obtained was heated in isopropyl ether until crystallization spontaneously occurred and 0.910 gm. of 1-cyano-thiocolchicine were obtained being a yield of 95%.

The product was recrystallized from absolute ethanol and occurred in the form of yellow prismatic crystals. It was soluble in chloroform, benzene, acetone and alcohols and insoluble in water and ether. The product had a melting point of 220° C. and a specific rotation (solvated) $[\alpha]_D^{20} = -100° \pm 10°$ (C.=0.5% in chloroform). The infra-red spectra showed a band towards 2,210 cm.$^{-1}$ representing the —CN group.

Analysis. — $C_{23}H_{24}O_5N_2S$; molecular weight=440.5. Calculated: C, 62.75%; H, 5.50%; N, 6.35%; S, 7.28%. Found: C, 62.7%; H, 5.6%; N, 6.4%; S, 7.5%.

This compound is not described in the literature.

EXAMPLE IV

Preparation of 1-cyano-desacetylamino-colchicine 210 mg. of the oxime of 1-formyl-desacetylamino colchicine, obtained according to Example I, were dissolved in 1.7 cc. of acetic acid anhydride. The solution obtained was heated to reflux for a period of two hours, then cooled to room temperature. Thereafter, 2 cc. of water were slowly added and agitation was continued for a period of one hour. Next the mixture was poured into water, neutralized with sodium hydroxide solution and extracted four times with 100 cc. of methylene chloride. The combined extracts were successively washed with a normal solution of sodium hydroxide and with water and then the organic solution was dried over magnesium sulfate, filtered and distilled to dryness under vacuum.

The residue was purified by crystallization from ether. 135 mg. of a pure product were obtained in the form of yellow crystals melting at 160° C.

This compound, 1-cyano-desacetylamino-colchicine, was soluble in alcohols, acetone, benzene and chloroform, slightly soluble in ether and insoluble in water.

Analysis. — $C_{21}H_{21}O_5N$; molecular weight=367.39. Calculated: C, 68.65%; H, 5.76%, N, 3.81%. Found: C, 68.9%; H, 5.9%; N, 3.8%.

This compound is not described in the literature.

EXAMPLE V

Preparation of 1-cyano-N-desacetyl-thiocolchicine

A solution of 0.500 gm. of 1-cyano-thiocolchicine, prepared according to Example III, in 5 cc. of methanol and 4 cc. of concentrated hydrochloric acid was heated at reflux for a period of nine hours. Next the solvent was distilled therefrom under vacuum and a solution of sodium hydroxide was added. The mixture was extracted with methylene chloride. The extract was washed with water, dried and distilled to dryness under vacuum. The residue was subjected to chromatography through alumina with elution with methylene chloride containing 2% of methanol.

0.340 gm. of a yellow product were obtained (being a yield of 75%) which product was crystallized from a mixture of benzene and isopropyl ether.

The product thus obtained, 1-cyano-N-desacetyl-thiocolchicine, occurred in the form of yellow polyhedral crystals and was soluble in chloroform, benzene, acetone, and alcohols and insoluble in water and ether. The compound had a melting point of 170° C. and a specific rotation (solvated) $[\alpha]_D^{20} = -75.5° \pm 1.5°$ (c.=0.5% in chloroform).

Analysis. — $C_{21}H_{22}O_4N_2S$; molecular weight=398.47. Calculated: C, 63.25%; H, 5.56%; N, 7.03%; S, 8.06%. Found: C, 63.3%; H, 5.7%; N, 6.7%; S, 8.3%.

This compound is not described in the literature.

The 1-cyano colchicinic derivatives, as stated previously, are endowed with interesting pharmacological properties. They possess a remarkable antimitotic action.

The 1-cyano colchicinic derivatives of the invention are utilized orally, transcutaneously or by local application. They can be prepared in the form of injectable solutions, injectable suspensions, prepared in ampules and in multiple-dose flacons, in the form of sterile powders to be prepared at the moment of use in an appropriate solvent, in the form of tablets, of coated tablets and of pomades.

The useful dosology is controlled between 1 and 25 mg. per day as a function of the method of administration and of the product utilized.

The pharmaceutical forms such as injectable solutions and suspensions, sterile powders, tablets, coated tablets and pomades are prepared according to the usual process.

EXAMPLE VI

Pharmacological studies of the 1-cyanocolchicinic derivatives

Antimitotic activity.—The antimitotic activity of the medicine, object of the invention, was studied according to the method described by Jequier et al., Arch. Int. Pharmacodyn., 1955, 103, 243. This method is based on the following facts:

(1) In the rat, the mitotic index of the femoral bone marrow (cells in mitosis/total number of cells) is almost the same on smears taken from diverse regions and on several fields of the same smear. This index of cells in mitosis is normally between 10 and 20 per thousand.

(2) After subcutaneous injection of antimitotic colchicinic derivatives, such as for example, colchicine, which blocks the division of cells at an intermediary state of mitosis, this index is elevated and attains its maximum towards the sixth hour.

(3) The increase observed is a function of the dose administered. The correlation is clearly shown by a curve in the form of an S whose point of inflexion occurs at about the index of cells in mitosis of 100.

As a measure of the stathmocinetic activity of the product, the antimitotic dose (DAM 100) defined as being that which furnishes 100 cells in mitosis per 1,000 cells is chosen.

The standard technique utilized is the following:

(1) Subcutaneous injection of the several doses of the substance to be studied are given to groups of two or three rats. The total volume injected is always 0.2 cc. per 100 gm. of body weight.

(2) The animals are sacrificed six hours after the injection, the femoral bone marrow is separated and the preparation of smears and coloration by the May Grunwald-Giemsa stain is followed. 1,000 cells in each preparation are counted.

(3) The DAM 100 according to the graphic representation of the index of cells in mitosis found as a function of the logarithm of the dose is determined.

The DAM 100 of 1-cyano-colchicine, determiend in these experimental condiitons, was 2 to 2.5 mg./kg.; that of 1-cyano-thicolchicine was 0.9 mg./kg.

As a comparative, the DAM 100 of colchicine was 0.7 mg./kg.

*Determination of toxicity.*—The test of toxicity was effected on mice of the Rockland strain weighing between 18 and 22 gm.

The compounds studied placed in aqueous suspension were administered intraperitoneally to groups of mice at increasing doses.

The animals were held under observation for a period of one week.

The lethal dose ($DL_{50}$) determined according to the graphic method of Miller et al. (Proc. Soc. Exp. Biol. 1944, 57, 261) was for 1-cyano-colchicine about 130 mg./kg. and for 1-cyano-thicolchicine about 40 mg./kg., whereas the $DL_{50}$ for colchicine was 2 mg./kg.

The comparison af the active doses (DAM 100) and the toxic doses of these two compounds, with reference to colchicine, shows clearly a more favorable therapeutic margin.

The preceding examples are illustrative of the invention. It is to be understood, however, that such changes and modifications as would occur to one skilled in the art may be employed without departing from the spirit of the invention or the scope of the appended claims.

We claim:

1. A 1-cyano colchicinic derivative of the formula

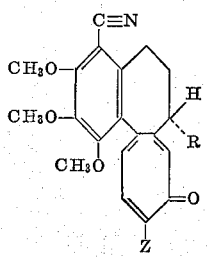

wherein R is selected from the group consisting of hydrogen and

$R_1$ is selected from the group consisting of hydrogen and alkyl having from 1 to 3 carbon atoms, $R_2$ is selected from the group consisting of hydrogen and the acyl of an organic carboxylic acid having from 1 to 24 carbon atoms selected from the group consisting of alkanoyl, alkenoyl, alkynoyl, hydroxyalkanoyl, phenylcarbonyl and naphthalylcarbonyl, and Z is selected from the group consisting of —O-alkyl having from 1 to 2 carbon atoms and —S-alkyl having from 1 to 2 carbon atoms.

2. 1-cyano-colchicine.
3. 1-cyano-desacetylamino-colchicine.
4. 1-cyano-thiocolchicine.
5. 1-cyano-N-desacetyl-thiocolchicine.
6. 1-formyl-desacetylamino-colchicine.
7. The oxlime of 1-formyl-desacetylamino-colchicine.

8. A process for the production of a 1-cyano-N-desacyl-colchicinic derivative of the formula

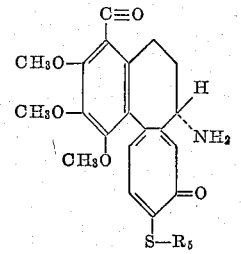

wherein $R_5$ represents alkyl having from 1 to 2 carbon atoms, which comprises the steps of (a) reacting a compound of the formula

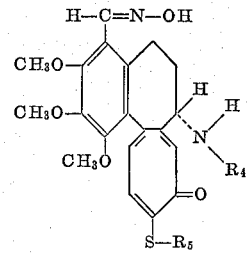

wherein $R_4$ represents the acyl of an organic carboxylic acid having from 1 to 24 carbon atoms selected from the group consisting of alkanoyl, alkenoyl, alkynoyl, hydroxy-alkanoyl, phenylcarbonyl and naphthalylcarbonyl, and $R_5$ has the above-assigned meaning, with acetic acid anhydride at the reflux temperature, (b) subjecting the resulting compound of the formula

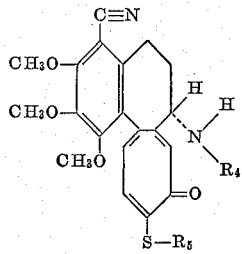

wherein $R_4$ and $R_5$ have the above-assigned meanings, to the action of concentrated hydrochloric acid in the presence of a lower alkanol, and (c) recovering said 1 - cyano - N - desacyl - colchicinic derivative.

9. The process of claim 8 wherein said lower alkanol is methanol.

References Cited by the Examiner

UNITED STATES PATENTS

| | | | |
|---|---|---|---|
| 2,383,444 | 8/1945 | Bruson | 260—465 |
| 2,912,456 | 11/1959 | Moffett | 260—465 |
| 2,974,160 | 3/1961 | Heininger | 260—465 |
| 3,051,625 | 8/1962 | Rao | 167—78 |
| 3,051,626 | 8/1962 | Rao | 167—78 |

OTHER REFERENCES

Chemical Abstracts Sixth Collective Index, Subjects BK–C$_z$, 1964, p. 3121s.

Chemical Abstracts, 52–1446i (1958).

Degering: An Outline of Organic Nitrogen Compounds, 1945, pages 188 to 190, University Lithoprinter, Ypsilanti, Michigan.

CHARLES B. PARKER, *Primary Examiner.*

JULIAN S. LEVITT, *Examiner.*

JEROME D. GOLDBERG, DALE R. MAHANAND,
*Assistant Examiners.*